(12) United States Patent
Oehler et al.

(10) Patent No.: US 9,250,725 B1
(45) Date of Patent: Feb. 2, 2016

(54) TENSIONING SYSTEM

(75) Inventors: Peter Richard Oehler, Beaverton, OR (US); Timothy Scott Engle, Beaverton, OR (US); William Loren Emery, Sherwood, OR (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 1332 days.

(21) Appl. No.: 13/084,245

(22) Filed: Apr. 11, 2011

Related U.S. Application Data

(60) Provisional application No. 61/322,793, filed on Apr. 9, 2010.

(51) Int. Cl.
*G06M 7/00* (2006.01)
*G06F 3/041* (2006.01)

(52) U.S. Cl.
CPC ...................................... *G06F 3/041* (2013.01)

(58) Field of Classification Search
CPC ............ G06F 2203/04103; G06F 2203/04109; G06F 3/041
USPC .......................................... 250/221; 345/173
See application file for complete search history.

(56) References Cited

U.S. PATENT DOCUMENTS 5,550,564 A * 8/1996 Cragun ......................... 345/173
2006/0227120 A1* 10/2006 Eikman ........................ 345/175

* cited by examiner

*Primary Examiner* — Thanh Luu
(74) *Attorney, Agent, or Firm* — Brandon Roper; Judy Yee; Micky Minhas

(57) ABSTRACT

A tensioning system includes a layer of a device and a flexible overlay film that is configured to cover the layer of the device. A tensioning mechanism is configured to tension the flexible overlay film against the layer of the device throughout a periphery. The tensioning mechanism also is configured to allow movement of the flexible overlay film in two dimensions.

19 Claims, 17 Drawing Sheets

TENSIONING SYSTEM

CROSS REFERENCE TO RELATED APPLICATIONS

The present application claims the benefit of U.S. Provisional Application No. 61/322,793, filed Apr. 9, 2010, which is incorporated herein by reference in its entirety for all purposes.

TECHNICAL FIELD

This disclosure relates to screen tensioning systems and, more particularly, screen tensioning systems for frustrated total internal reflection—(FTIR) based touch sensors.

BACKGROUND

Touch sensitive systems refer, in general, to systems that detect and respond to multiple simultaneous points of contact on a surface. Typically, a touch sensitive system is incorporated within an electronic device in the form of a touch screen display that allows a user to both view and manipulate objects using one or more inputs that are in contact with the screen. Examples of electronic devices in which a touch sensitive system has been used include computer tablets, personal digital assistants (PDA), and cell-phones, among others. A variety of techniques are available that enable touch sensitive systems. For example, some touch systems identify surface contact by detecting changes in heat, pressure, capacitance or light intensity.

SUMMARY

Techniques are described for screen tensioning used in, for example, screen tensioning systems for frustrated total internal reflection—(FTIR) based touch sensors.

Implementations of the described techniques may include hardware and a method or process implemented at least partially in hardware.

DETAILED DESCRIPTION

Figure 1:
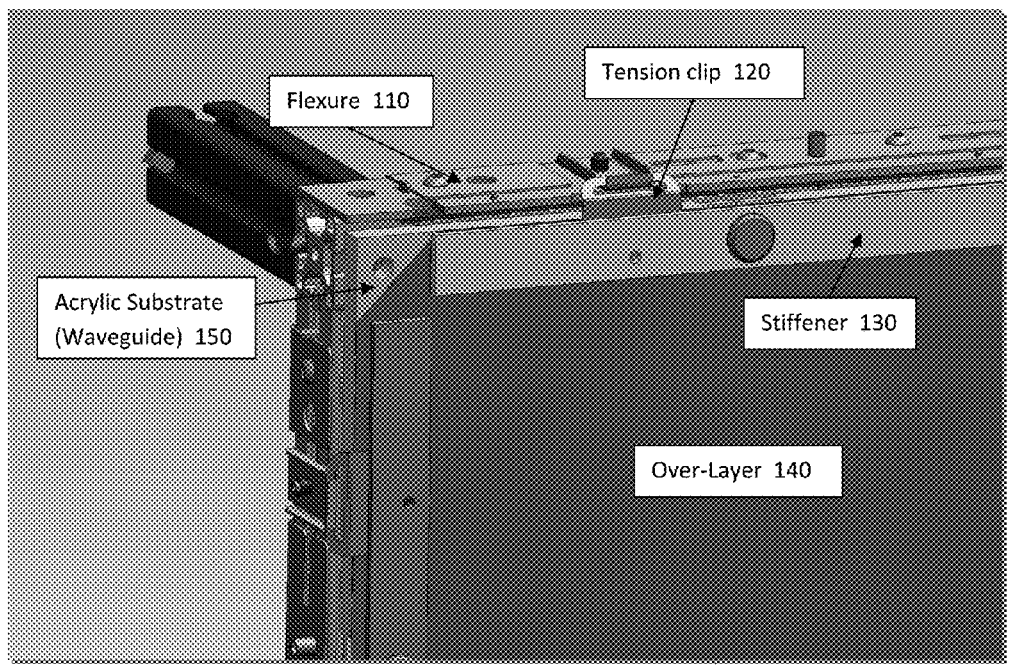
FIG. 1 is a perspective view of a front surface of an example screen tensioning system.

Techniques are described for tensioning overlay films. In some implementations, a device (e.g., a touch sensor device) includes a flexible overlay film that covers an outer surface of the device. In these implementations, the flexible overlay film is secured to the outer surface of the device using a bi-directional screen tensioning system. The bi-directional screen tensioning system keeps the flexible overlay film flat against under layers of the device (e.g., flat against a waveguide of a FTIR based touch sensor device) while allowing movement (e.g., expansion and/or contraction) in two dimensions to reduce warping caused by temperature and humidity changes. By keeping the overlay film tensioned while accommodating changes to the flexible overlay film, the bi-directional screen tensioning system may reduce waviness of the flexible overlay film throughout usage of the device over its lifetime and, therefore, may improve screen appearance, touch feel (e.g., minimal tenting or drumhead effect) and image resolution of the device, as compared to other mechanisms to secure overlay films, such as directly taping the flexible overlay film under layers of the device.

In some examples, the bi-directional screen tensioning system is applied to a FTIR based touch sensor device that includes a pliable waveguide that receives radiation emitted by a radiation source and causes at least some of the received radiation to undergo total internal reflection within the pliable waveguide. In these examples, the FTIR based touch sensor device includes an image sensor that detects at least some radiation that escapes from the pliable waveguide when it is physically deformed by a touch (e.g., a touch of a user's finger) and, thereby, detects the touch. Because the pliable waveguide is being physically deformed by touches, the FTIR based touch sensor device includes a flexible overlay film that covers the pliable waveguide and protects the pliable waveguide from damage resulting from touches (e.g., reduces residue from a user's finger from reaching the pliable waveguide).

To secure the flexible overlay film, the bi-directional screen tensioning system tensions the flexible overlay film flat against the pliable waveguide throughout a periphery while maintaining an air gap between the pliable waveguide and the flexible overlay film. The air gap between the pliable waveguide and the flexible overlay film is needed to enable total internal reflection within the pliable waveguide. However, the air gap is ideally minimized such that the finger travel required to activate a touch point is perceived as zero or very small. In this regard, the waveguide and the flexible overlay film may be tensioned against one another as tight as possible and the air gap may be microscopic roughness on the surface of the flexible overlay film that presses against the waveguide. The microscopic roughness is generally sufficient to enable total internal reflection within the waveguide because the waveguide and the flexible overlay film are tensioned against one another, rather than being adhered to one another using an adhesive.

The air gap also allows the flexible overlay film to move (e.g., expand and/or contract) relative to the pliable waveguide and, when such movement occurs, the touch surface may appear wavy and cause the image to appear distorted. The bi-directional screen tensioning system reduces the occurrence of waviness by allowing the overlay film to have some flexibility while forcing the overlay film into close contact with the pliable waveguide throughout its entire surface.

Figure 2:
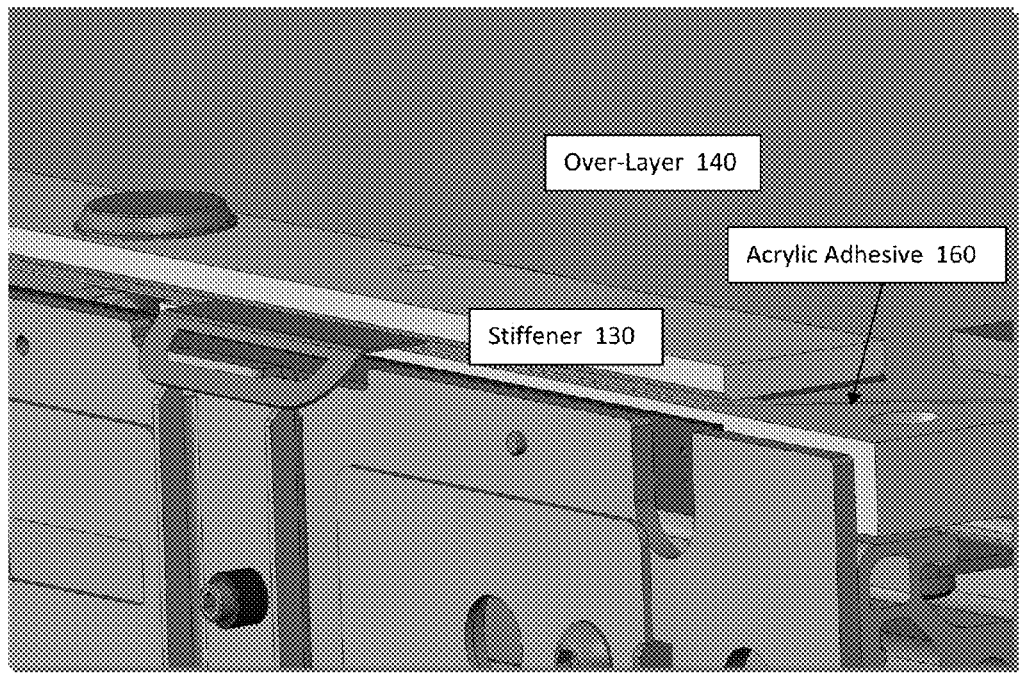
FIG. 2 is a perspective view of a top surface of the example screen tensioning system.

FIGS. 1 and 2 illustrate an example screen tensioning system. As shown, the screen tensioning system includes metal flexures 110, tension clips 120, stiffeners 130 (e.g., plastic stiffeners), an over-layer 140 (e.g., a Polyethylene-Terephthalate (PET) film layer), and an acrylic substrate 150. The acrylic substrate 150 may be an acrylic waveguide that causes at least some received radiation to undergo total internal reflection within the acrylic waveguide. In this example, the over-layer 140 is held in close proximity to the waveguide. The over-layer 140 may be a film stack with any combination of materials or layers that need to be held flat against the waveguide. For instance, the over-layer 140 may be a film stack, such as a Near Infra Red (NIR) light absorbing dye coated Polyethylene-Terephthalate (PET) layer, diffuser and optical frustrating layer.

To attach to the over-layer 140 in a tensioned manner, the system includes stiffeners 130 attached to the over-layer 140. The stiffeners 130 may be plastic and may serve multiple purposes. For example, the stiffeners 130 may transfer forces to the over-layer 140 as well as spreading point loads over a larger area of the over-layer 140. In this example, the stiffeners 130 may distribute the high tension across each edge of the over-layer 140, which may improve over simply using point loads, such as lacing or individual springs, that result in local regions of high tension with large areas of low tension in between. The stiffeners 130 may provide a uniform tension on the perimeter of the over-layer.

The stiffeners 130 are attached to the over-layer 140 using acrylic adhesive 160. The acrylic adhesive 160 may be a low surface energy adhesive, such as high-strength bonding tape (e.g., 3M™ VHB™ adhesive tape). In addition, the CTE (Coefficient of Thermal Expansion) of the stiffeners 130 may be selected to allow the stiffeners 130 to expand and contract with the over-layer 140. In this regard, the material of the stiffeners 130 may be selected to have similar expansion properties as the over-layer 140. The adhesive may act as a compliant material to allow for small variance in CTE. The stiffener material may also be selected to have a CTE slightly higher than the over-layer 140, so that as the screen heats up under normal operation, the over-layer 140 may be additionally tensioned in two directions.

The screen tensioning system shown in FIGS. 1 and 2 applies forces to the over-layer 140 in two directions using a single mechanism. The result of the applied forces is a planar surface that translates towards the waveguide. The screen tensioning system allows any flexible film to be pulled tight, and forced into contact with the waveguide. For FTIR applications, the over-layer 140 (e.g., film stack) needs to be in very close proximity to the waveguide, but cannot be adhered to the waveguide surface. The screen tensioning system keeps the entire surface of the over-layer 140 in very close proximity to the waveguide, not just the center. For projection systems, the over-layer 140 (e.g., film stack) on which you are projecting also needs to be a planar surface or visual abnormalities may occur. The screen tensioning system shown in FIGS. 1 and 2 provides both functions.

In addition, the screen tensioning system shown in FIGS. 1 and 2 reduces the so-called "drumhead" effect. When a surface is pulled taught around an open frame, a drumhead or trampoline is created. In this regard, lifting of the surface on or near the edges of the open frame may occur. The lifting of the now taught surface leaves a noticeable air gap if you bring a second surface to be in close proximity to the bottom surface. The screen tensioning system shown in FIGS. 1 and 2 reduces such an air gap when a second surface is brought in close proximity.

Figure 3:
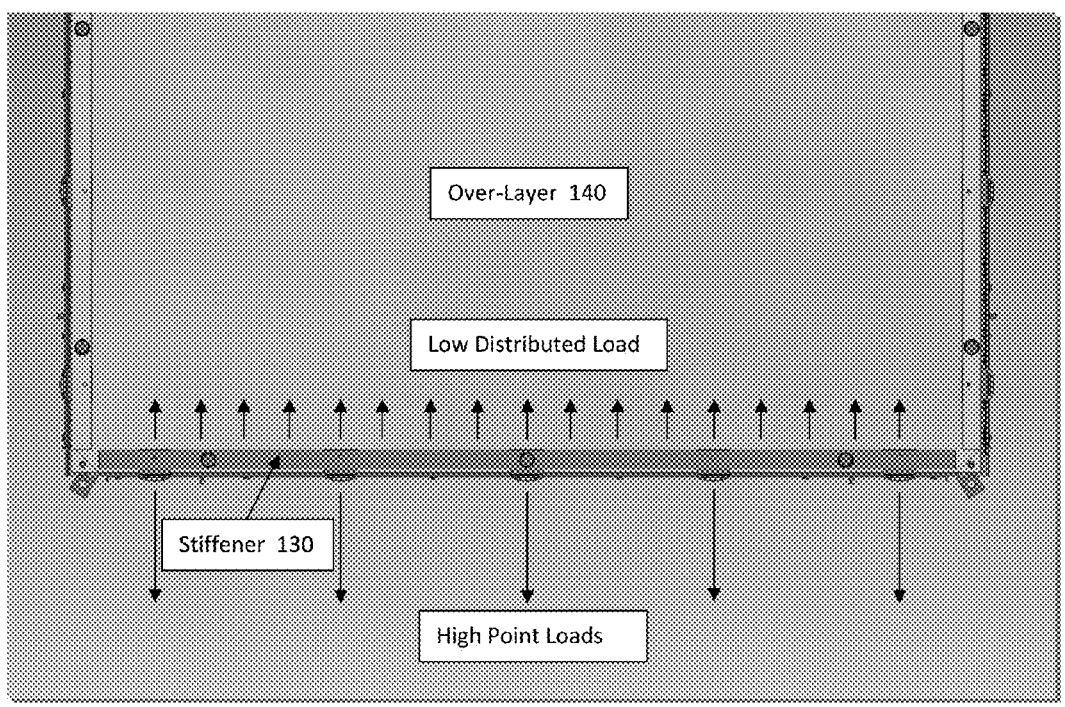
FIG. 3 is a view of the example screen tensioning system that illustrates example load distribution.

FIG. 3 illustrates example load distribution for the example screen tensioning system. The width of the stiffeners 130 is sufficient to disperse the point loading across the entire length of the stiffener 130, as shown in FIG. 3. By removing localized stress concentrations, the outward radial force is uniform around the parameter of the over-layer 140. The stiffeners 130 also reduce the potential for material or adhesive failure because the force per unit area is relatively low.

Figure 4:
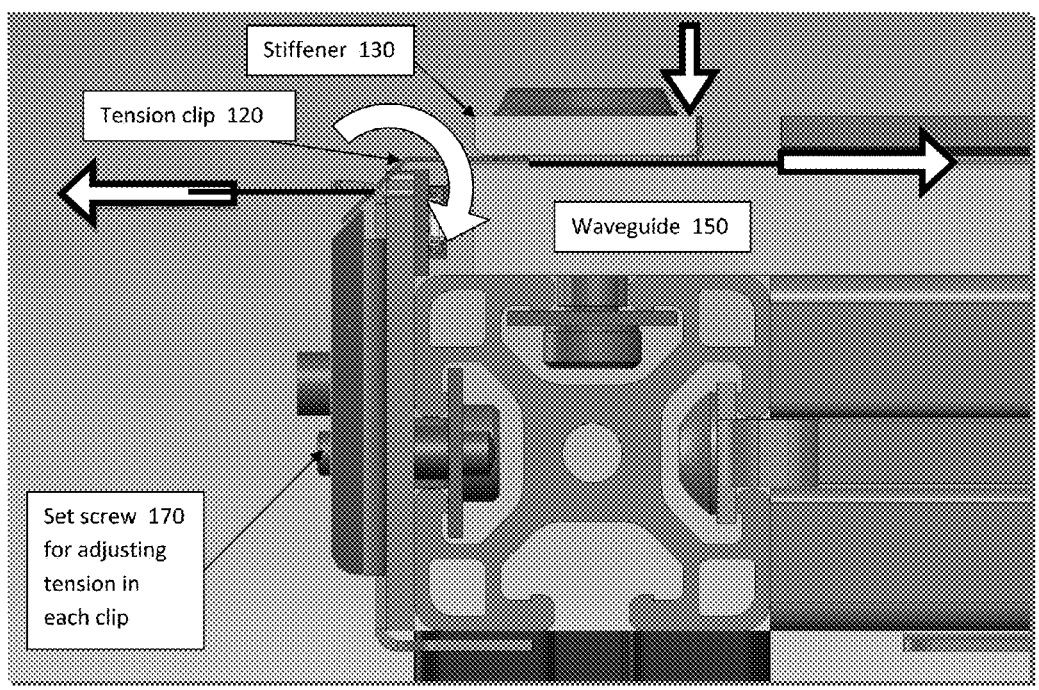
FIG. 4 is a view of the example screen tensioning system that illustrates example tension forces and example tension adjustment.

FIG. 4 illustrates example tension forces and example tension adjustment for the example screen tensioning system. The tension clips 120 are the mechanism that take a linear pull direction and translate it into horizontal and vertical directions. The tension clips 120 may be made from spring like material (e.g., 301½ hard Stainless Steel). The tension clips 120 may be made of a plastic or metal material. As illustrated in FIG. 4, the bi-directional movement is obtained by having the applied force and reaction force in different planes (i.e., the applied force and the reaction force are not in the same plane). The offset in these two forces causes a rotational moment. In this example, the motion is in the clockwise direction. The induced moment causes the stiffener 130 and the attached over-layer 140 to rotate downward into the waveguide 150.

The screen tensioning system also allows the tension to be adjustable at each of the tension clip locations. In this example, the screen tensioning system has set screws 170 for adjusting the tension, but any mechanism for tension adjustment may be used. To adjust the tension, a user turns the set screws 170 to create a pull force by displacing the flexure arm relative to the rigid frame.

Figure 5:
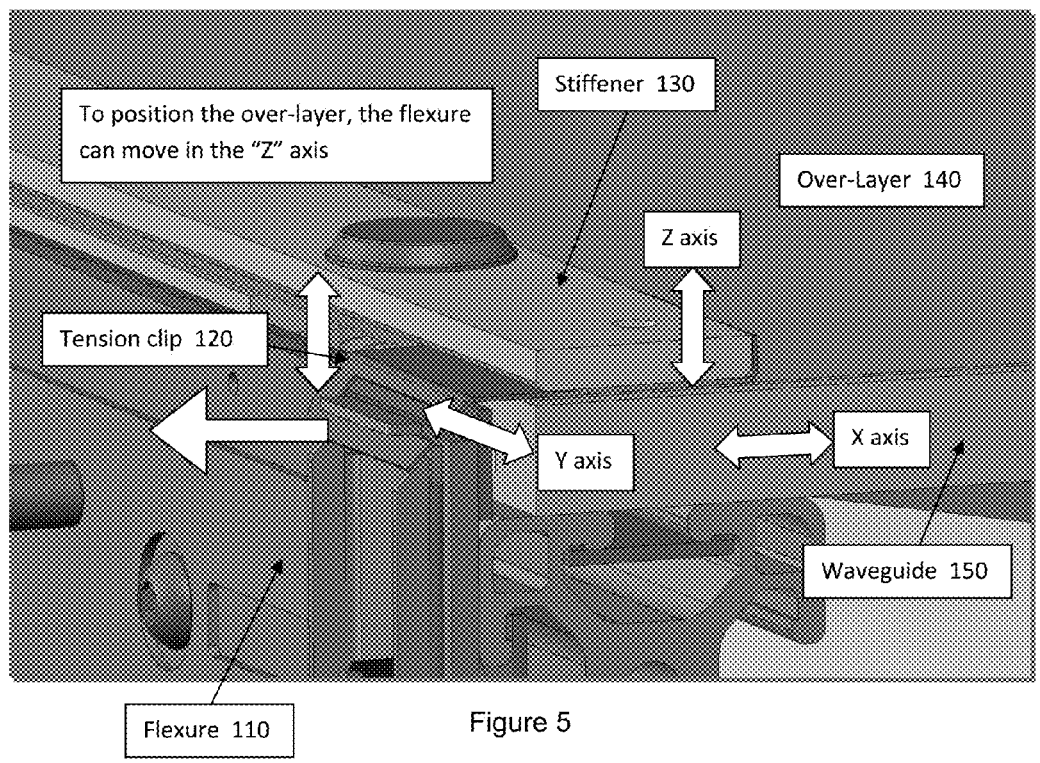
FIG. 5 is a view that illustrates example flexures of the example screen tensioning system.

FIG. 5 illustrates example flexures 110 of the example screen tensioning system. The flexures 110 provide lever arms that induce the lateral pull on the tension clips 120. The flexures 110 also constrain the tension clips 120 in the "Z" access. This vertical constraint allows the tension clip 120 to be adjusted up and down in the vertical direction. The adjustment accounts for manufacturing variances and allows equal spacing to be maintained between the over-layer 140 and waveguide 150.

Figure 6:
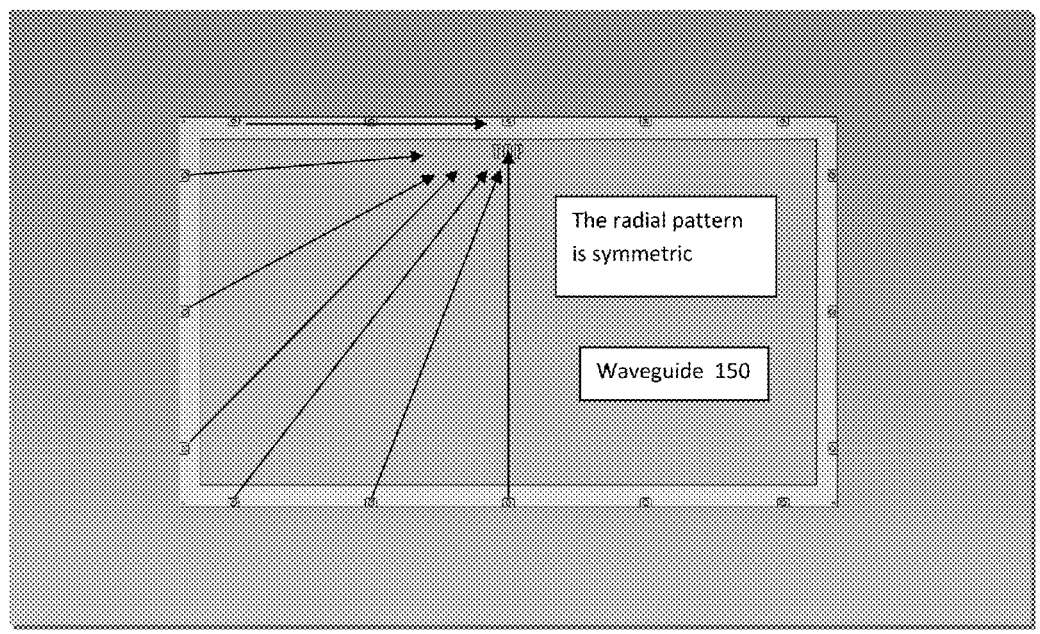
FIG. 6 is a view that illustrates an example of a mechanism for securing a waveguide in a manner that decouples thermal expansion of the waveguide from the tensioned screen.

FIG. 6 illustrates an example of a mechanism for securing a waveguide in a manner that decouples thermal expansion of the waveguide from the tensioned over-layer or screen. In an FTIR application, the over-layer (e.g., film stack) is not laminated to the waveguide. One reason the over-layer is not laminated to the waveguide is because the various layers have differences in CTE (coefficient of thermal expansion). To decouple the thermal expansion of the waveguide from the tensioned over-layer or screen, the waveguide is allowed to move in the "X" and "Y" directions. To enable movement in the "X" and "Y" directions, the system includes a series of radial machined slots and custom fasteners that allow movement along the "X" and "Y" axes, but restrict movement along the "Z" axis. This allows the acrylic waveguide to remain in a stress free state regardless of changes in temperature and/or humidity that result in expansion and/or contraction of the acrylic waveguide.

As shown in FIG. 6, a mounting hole pattern is radial from a center fastener and symmetric. The mounting hole pattern is created because the top, center fastener secures the waveguide tightly (e.g., minimal or no expansion allowed) and the other fasteners have slotted configurations that allow expansion and contraction to produce the pattern shown. As the waveguide heats and cools, the mounting hole pattern allows the waveguide to expand and contract without inducing internal stresses. Other mounting hole patterns may be used.

Figure 7:
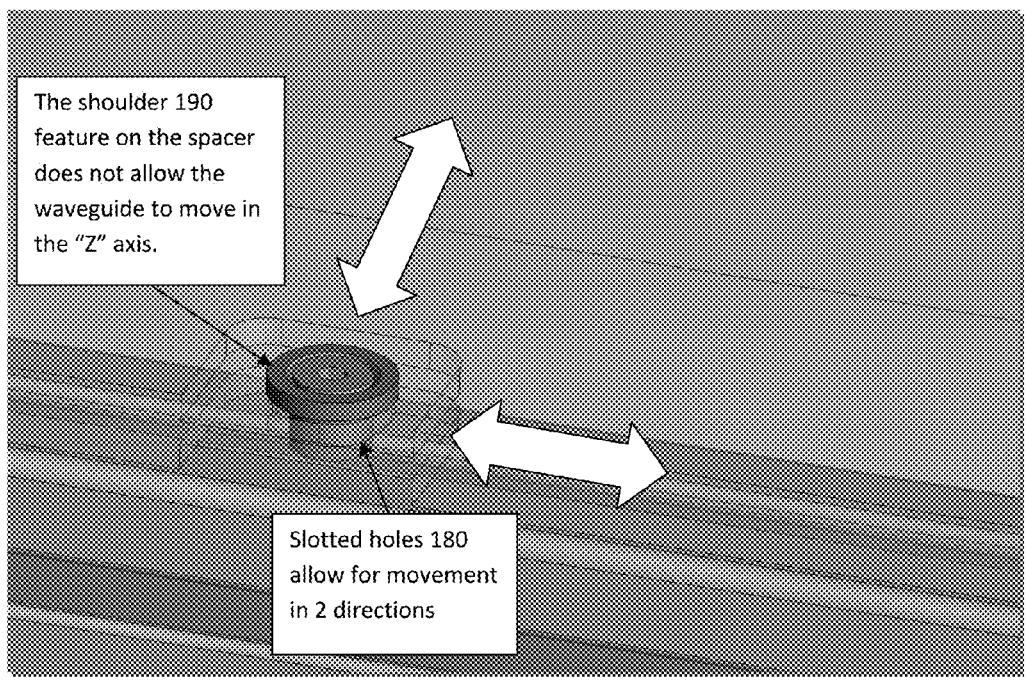
FIG. 7 is a view that illustrates an example of fastening mechanisms for a waveguide that allow movement of the waveguide in two directions.

FIG. 7 illustrates an example of fastening mechanisms for a waveguide that allow movement of the waveguide in two directions. As shown, the fastening mechanism includes a slotted hole 180 that allows the waveguide to move in "X" and "Y" directions and, therefore, accommodate expansion and contraction of the waveguide due to environmental changes. The fastening mechanism also includes a shoulder part 190 that restricts movement of the waveguide in the "Z" direction. Accordingly, the shoulder part 190 of the fastening mechanism causes the waveguide to be held in close contact with other components (e.g., the over-layer) while the slotted hole 180 of the fastening mechanism allows the waveguide to expand and contract without warping.

In some examples, the screen tensioning system using the fastening mechanisms shown in FIG. 7 allows the tensioned over-layer to move in two directions with one mechanism and maintains the over-layer flat from the center to the edges where the stiffeners are attached. In a simple tensioned over-layer or screen, sufficient non-imaging borders are used to constrain the projected image size to within the region that is relatively flat. Although borders still exist, the overall boarder width may be significantly reduced. Because of the attachment mechanisms, the relative stack height may be greatly reduced. Also, by decoupling the over-layer (e.g., film stack) from the acrylic waveguide, materials with different CTEs may be used with reduced risk of creating visual abnormalities.

The screen tensioning system described throughout this disclosure may be applied to any screen size of a display. To apply the screen tensioning system to larger or multi-panel displays, the stiffeners and tension clip spacing may be optimized for any size application.

Figure 8:
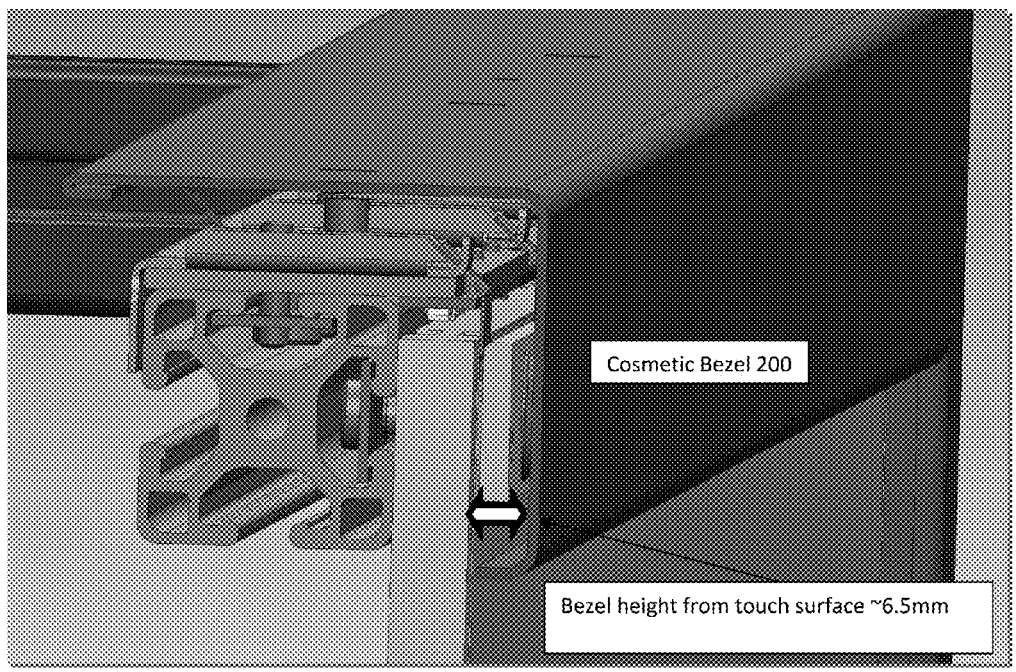
FIG. 8 illustrates a side view of the example screen tensioning system that includes a bezel.

FIG. 8 illustrates an area of an example screen tensioning system that includes a bezel 200. As shown, the screen tensioning system includes a relatively small bezel 200 to accommodate the tensioning components. Because of the configuration of the tensioning components, the bezel size may be reduced and the impact of the tensioning components on the product form factor may be minimized. Reducing (e.g., minimizing) the size of the bezel 200 is not only for aesthetics, but also improves the installation and overall user interaction. Specifically, a large bezel height creates a step around the parameter of the displayed image which causes users to not approach the edges of the projected image. By reducing (e.g., minimizing) the impact on the product form factor, multi-panel displays may be placed next to each other with only a small cosmetic strip to cover the tension mechanisms.

Figure 9:
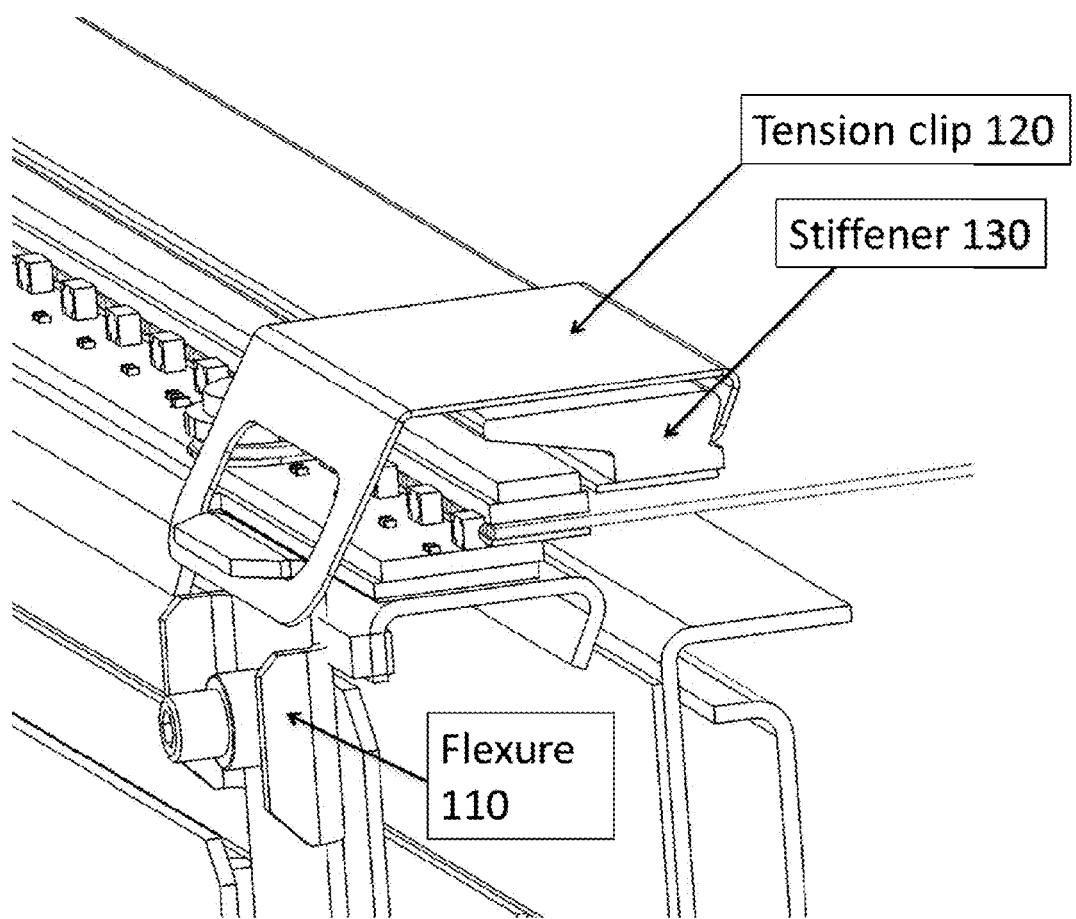
FIG. 9 is a perspective view of a second example screen tensioning system.

FIG. 9 illustrates a second example screen tensioning system. The second example screen tensioning system is similar to the screen tensioning system described above with respect to FIGS. 1-8 and has similar attributes unless otherwise specified. The primary difference between the second example screen tensioning system and the screen tensioning system described above with respect to FIGS. 1-8 is the design of the tension clips 120 and the stiffeners 130. Specifically, the tension clips 120 are positioned over the stiffeners 130 and cover an outer surface of the stiffeners 130. The tension clips 120 have a hook portion at an end of the tension clips 120 that attaches to the stiffeners 130. The stiffeners 130 are shaped to receive the hook portion of the tension clips 120. As shown in FIG. 9, the hook portion of the tension clips 120 hook into a groove defined at a bottom portion of the stiffeners 130 to connect the tension clips 120 with the stiffeners 130. In this design, the tension clips 120 stably hook onto the stiffeners 130 and pull the stiffeners 130 toward an under-layer of the device to tension an over-layer adhered to the stiffeners 130 against the under-layer of the device. For instance, the force applied by the tension clips 120 to the stiffeners 130 pulls the stiffeners 130 to tension the over-layer against the under-layer of the device while causing relatively low (e.g., minimal or no) rotation of the stiffeners 130. By reducing rotational force applied to the stiffeners 130, the second example screen tensioning system may reduce lifting and/or denting of the over-layer that may occur due to rotation of the stiffeners 130. In addition, because the hook portion of the tension clips 120 hook into the groove defined at the bottom portion of the stiffeners 130, no portion of the tension clips 120 contacts the over-layer. Because the tension clips 120 do not contact the over-layer, the second example screen tensioning system may reduce localized denting of the over-layer that may occur at contact points between the tension clips 120 and the over-layer.

The stiffeners 130 also are shaped at a top portion to accommodate other components of the tensioning system while maintaining sufficient stiffness and adhesion area of the stiffener to the over-layer. The cutout region makes room for components adjacent to the screen tensioning components. The extended width of the stiffener 130 provides a similar amount of mechanical stiffness as if the stiffener had no cut-out. With the shape of the stiffeners 130, adequate tensioning may be achieved while reducing a form factor of the device through reduction in overall size of the tensioning system at edges of the device.

Figure 10:
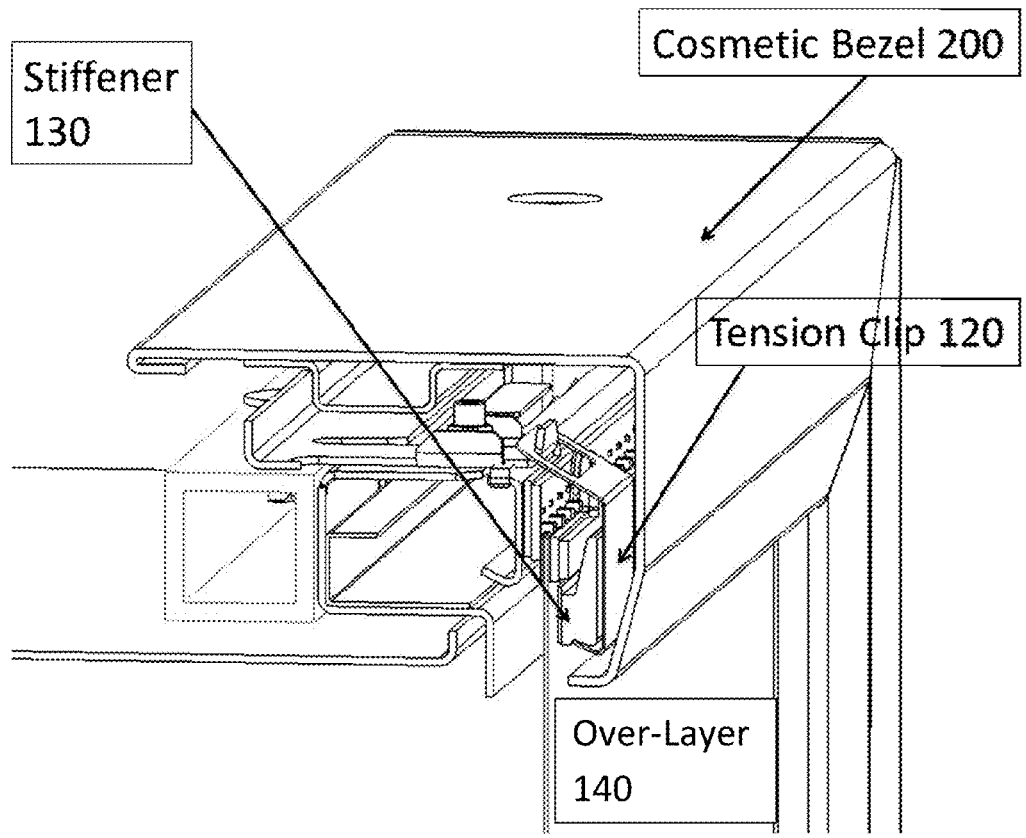
FIG. 10 is a side view of the second example screen tensioning system with a bezel.

FIG. 10 illustrates an area of the second example screen tensioning system that includes a bezel 200. As shown, the second example screen tensioning system includes a relatively small bezel 200 to accommodate the tensioning components. Because of the configuration of the tensioning components, the bezel size may be reduced and the impact of the tensioning components on the product form factor may be minimized. Reducing (e.g., minimizing) the size of the bezel 200 is not only for aesthetics, but also improves the installation and overall user interaction. Specifically, a large bezel height creates a step around the parameter of the displayed image which causes users to not approach the edges of the projected image. By reducing (e.g., minimizing) the impact on the product form factor, multi-panel displays may be placed next to each other with only a small cosmetic strip to cover the tension mechanisms.

Figure 11:
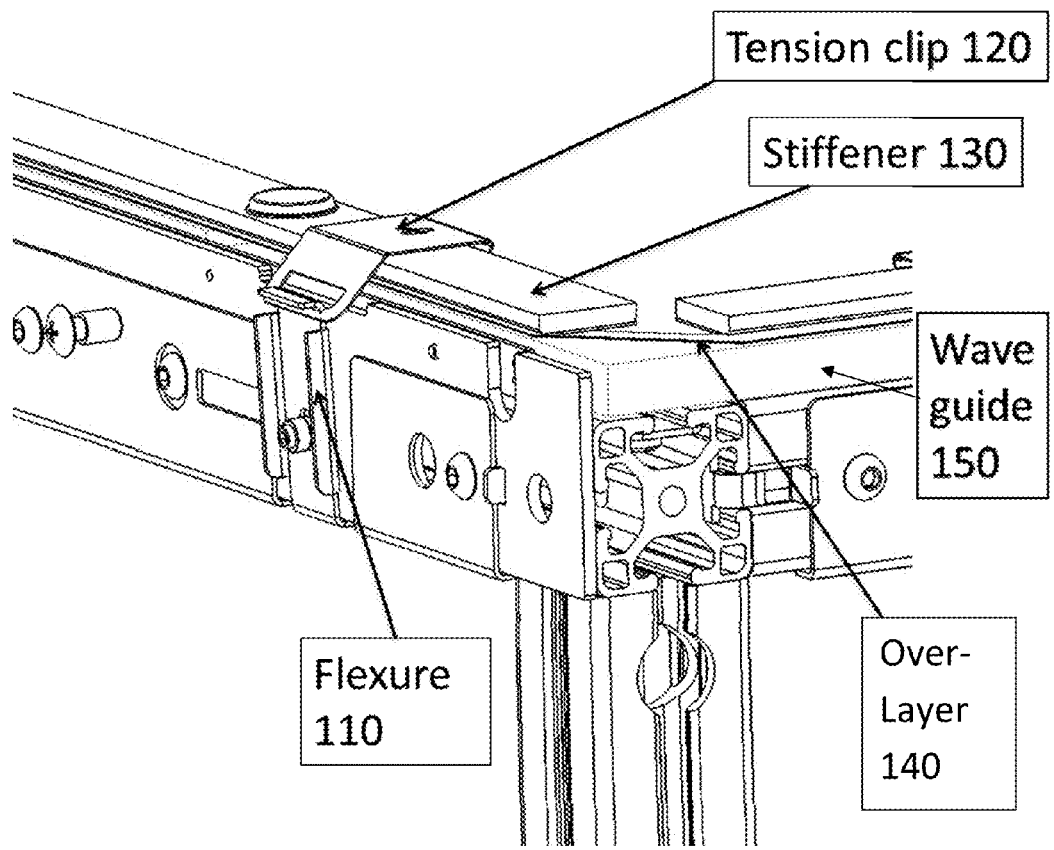
FIG. 11 is a perspective view of the second example screen tensioning system showing an over-layer tensioned against a waveguide.

FIG. 11 illustrates the second example screen tensioning system showing an over-layer 140 tensioned against a waveguide 150. The waveguide 150 may be part of an FTIR-based touch sensor. In this regard, the waveguide 150 may receive radiation (e.g., infrared light) from a radiation source (e.g., an infrared LED) and cause at least some of the received radiation to undergo total internal reflection. When a touch input is received, some of the received radiation undergoing total internal reflection is frustrated and escapes from the waveguide 150. An imaging sensor detects the escaped radiation and detects a touch input based on detection of the escaped radiation.

As shown in FIG. 11, the tensioning system tensions the over-layer 140 closely against the waveguide 150 throughout an entire surface of the waveguide 150 without adhering the over-layer 140 to the waveguide 150 using an adhesive. Because the over-layer 140 is not adhered to the waveguide 150, an air gap may be maintained between the over-layer 140 and the waveguide 150. For example, the over-layer 140 may have microscopic roughness on a surface of the over-layer 140 that contacts the waveguide 150. In this example, the microscopic roughness provides a sufficient air gap to enable radiation to undergo total internal reflection within the waveguide 150. In addition, because the air gap is relatively small, the over-layer 140 may be tensioned in very close contact against the waveguide 150 throughout its entire surface, which provides a relatively good touch response throughout.

Figure 12:
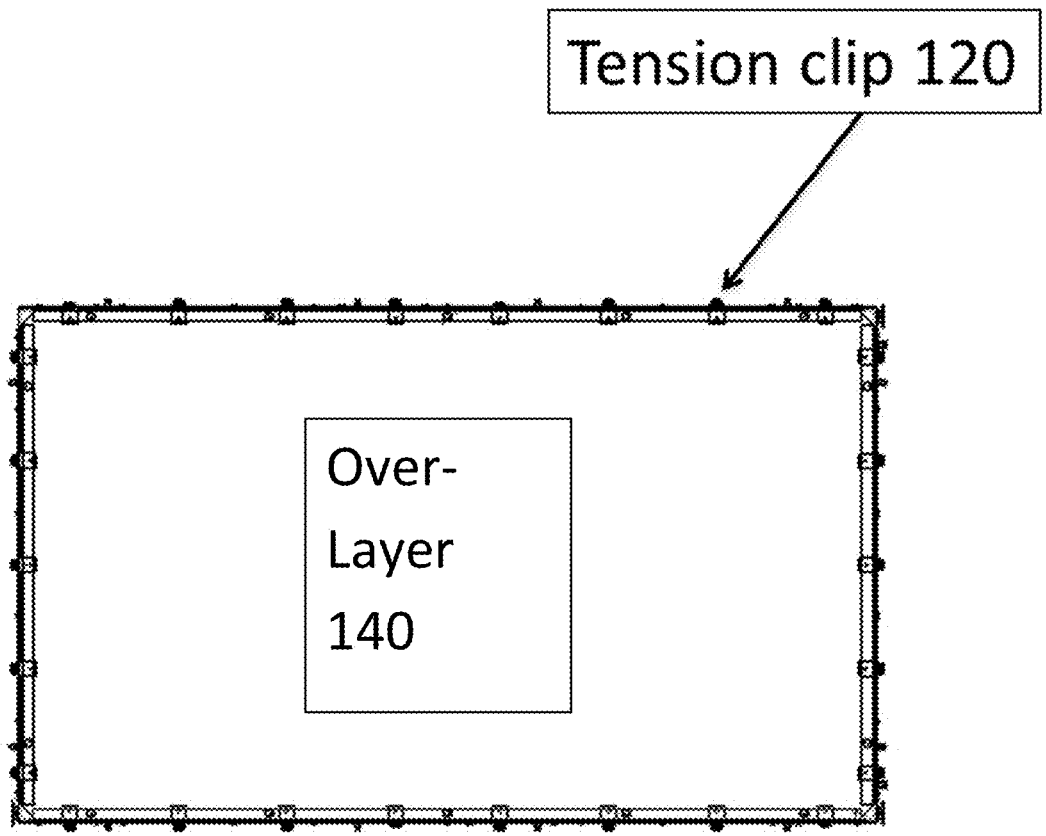
FIG. 12 illustrates an example of tension clip position in a screen tensioning system.

FIG. 12 illustrates an example of tension clip position in a screen tensioning system. As shown, tension clips 120 are placed along an entire periphery of the over-layer 140. Tension clips 120 may be placed relatively close to corners of the over-layer 140. In addition, a relatively shorter spacing may be used between tension clips 120 placed at top and bottom edges (e.g., longer edges) of the over-layer 140 as compared to side edges (e.g., shorter edges) of the over-layer 140. The tension clip position pattern shown in FIG. 12 may be used in any of the screen tensioning systems described throughout this disclosure.

Figure 13:
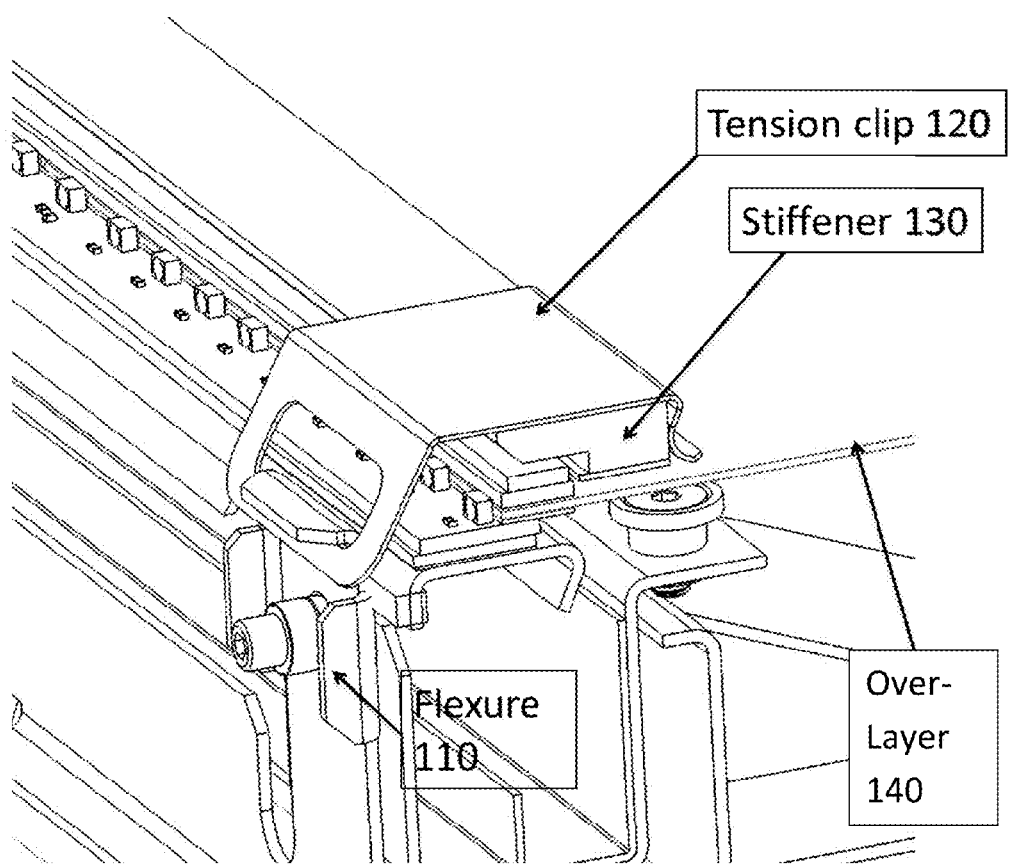
FIG. 13 is a perspective view of a third example screen tensioning system.
Figure 14:
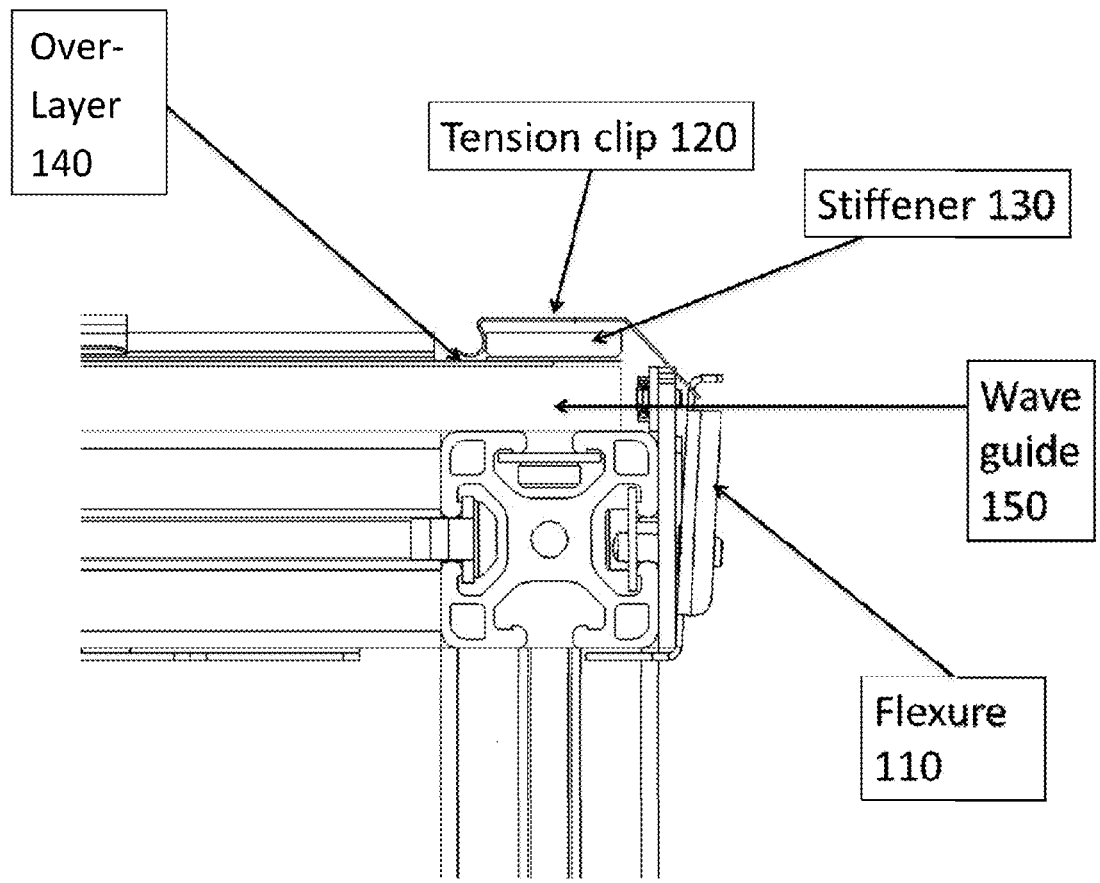
FIG. 14 is a side view of the third example screen tensioning system showing an over-layer tensioned against a waveguide.
Figure 15:
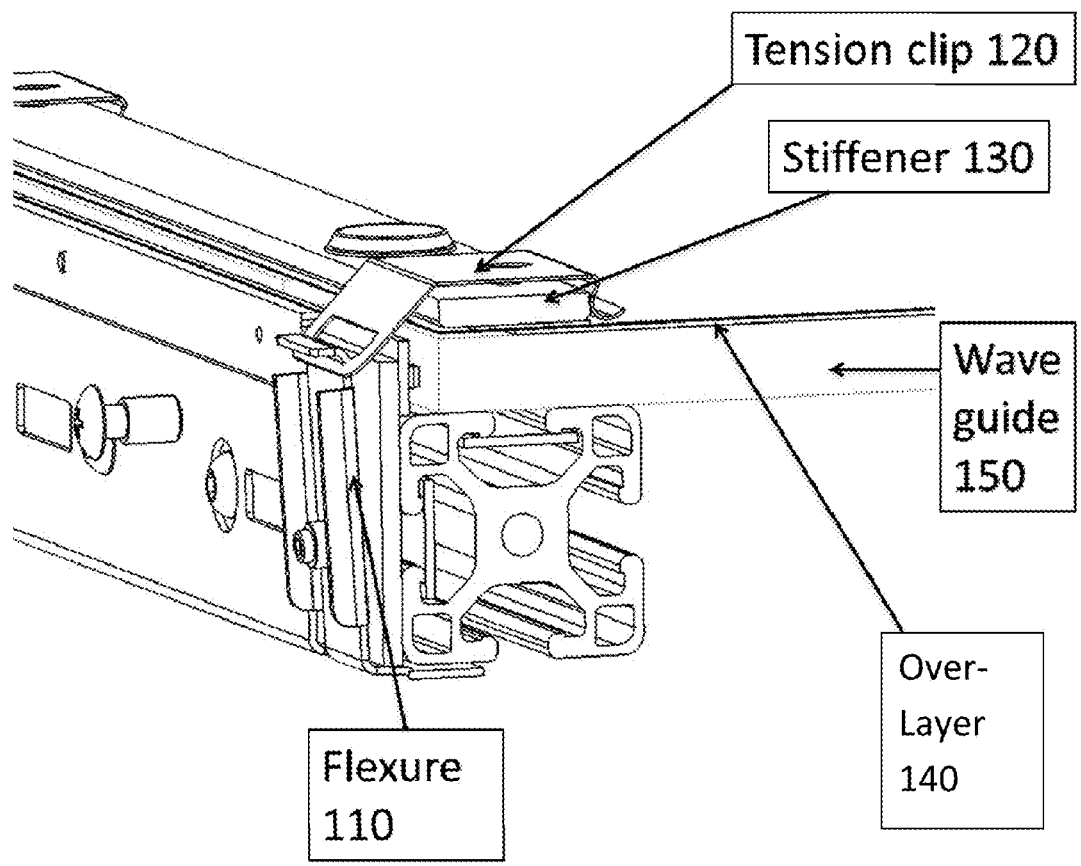
FIG. 15 is a perspective view of the third example screen tensioning system showing an over-layer tensioned against a waveguide.
Figure 16:
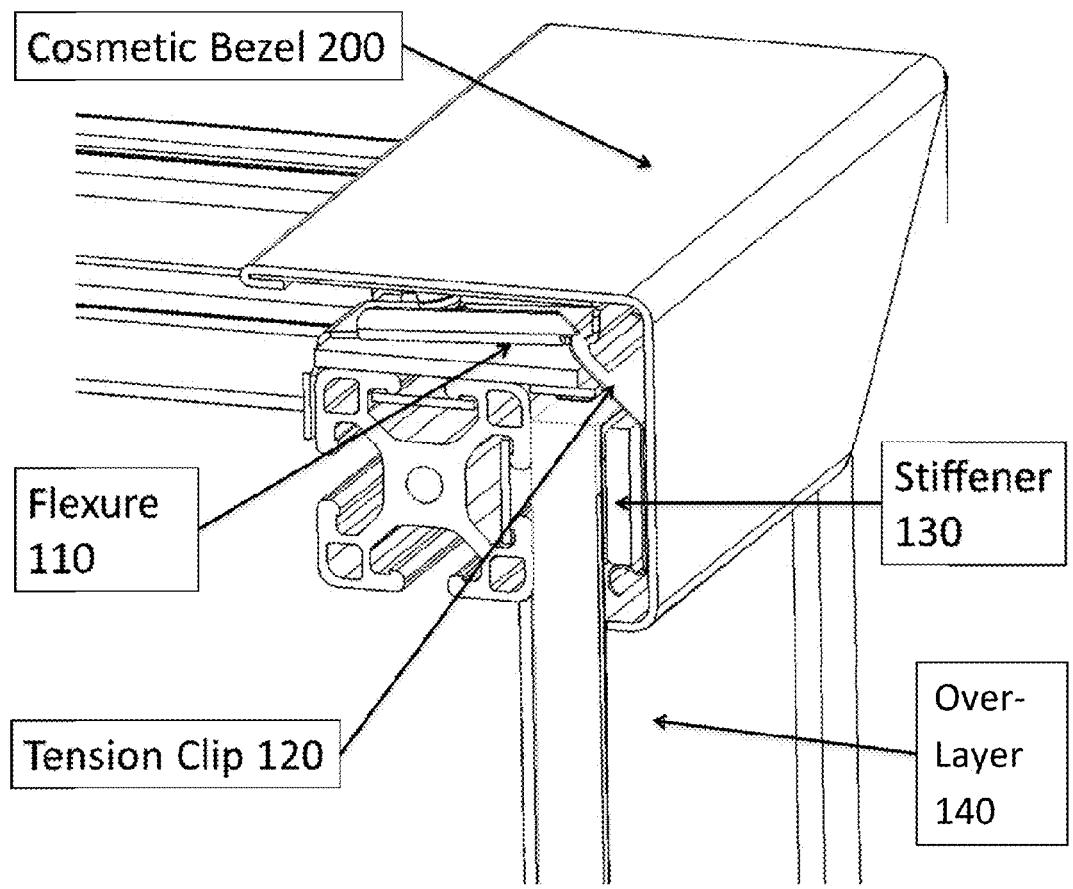
FIG. 16 is a perspective view of the third example screen tensioning system showing an over-layer tensioned against a waveguide with a bezel.
Figure 17:
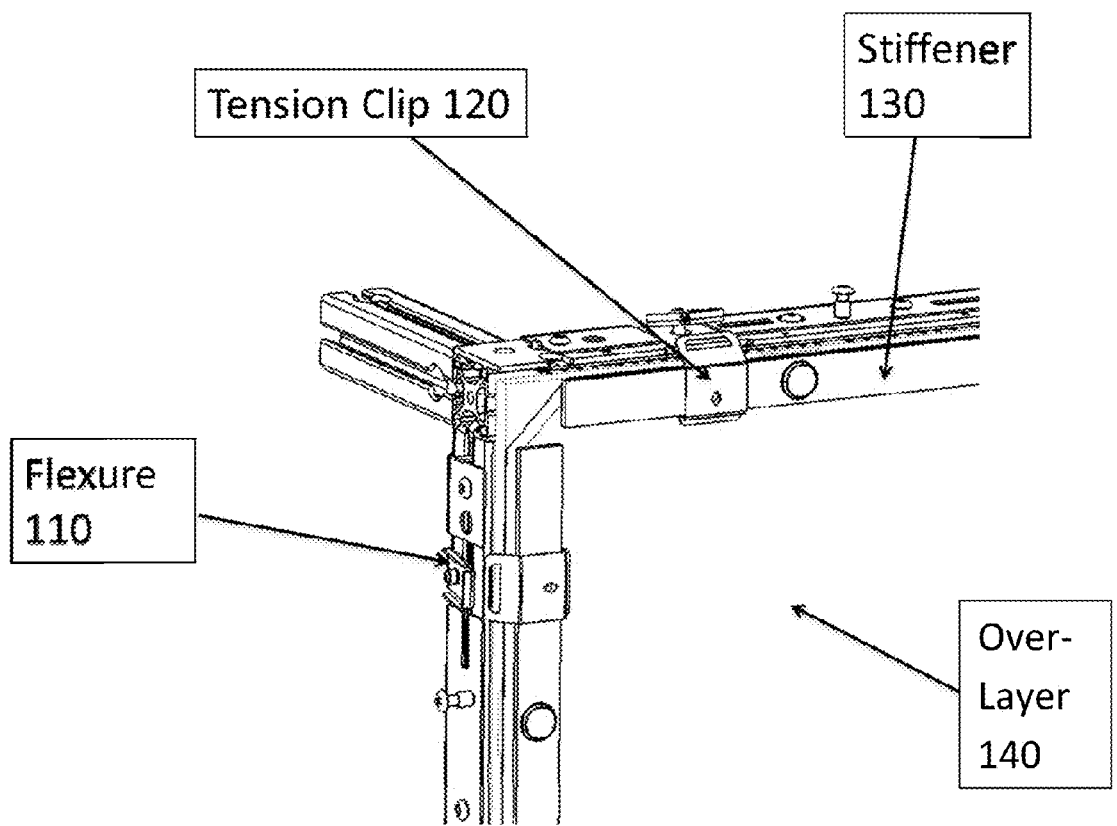
FIG. 17 is a perspective view of the third example screen tensioning system showing an over-layer tensioned against a waveguide with tension clips placed along a periphery of the over-layer.

FIG. 13 illustrates a third example screen tensioning system. The third example screen tensioning system is similar to the screen tensioning systems described above with respect to FIGS. 1-12 and has similar attributes unless otherwise specified. The primary difference between the third example screen tensioning system and the screen tensioning systems described above with respect to FIGS. 1-12 is the design of the tension clips 120 and the stiffeners 130. In the third example screen tensioning system, the tension clips 120 are positioned over the stiffeners 130 and cover an outer surface of the stiffeners 130. In this example, the tension clips 120 have a curved portion at an end of the tension clips 120 that attaches to the stiffeners 130. The curved portion of the tension clips 120 surrounds an edge of the stiffeners 130. As shown in FIG. 13, the curved portion of the tension clips 120 covers and presses against a bottom edge of the stiffeners 130 to connect the tension clips 120 with the stiffeners 130. In this design, the tension clips 120 stably connect to the stiffeners 130 and pull the stiffeners 130 toward an under-layer of the device to tension an over-layer adhered to the stiffeners 130 against the under-layer of the device. For instance, the force applied by the tension clips 120 to the stiffeners 130 pulls the stiffeners 130 to tension the over-layer against the under-layer of the device while causing relatively low (e.g., minimal or no) rotation of the stiffeners 130. By reducing rotational force applied to the stiffeners 130, the third example screen tensioning system may reduce lifting and/or denting of the over-layer that may occur due to rotation of the stiffeners 130.

The stiffeners 130 also are shaped at a top portion to accommodate other components of the tensioning system while maintaining sufficient stiffness and adhesion area of the stiffener to the over-layer. The cutout region makes room for components adjacent to the screen tensioning components. The extended width of the stiffener 130 provides a similar amount of mechanical stiffness as if the stiffener had no cut-out. The tension clips 120 and the stiffeners 130 shown in the third example screen tensioning system may have reduced manufacturing costs as compared to the second example screen tensioning system due to a relatively simpler design.

FIGS. 14-17 illustrate the third example screen tensioning system showing an over-layer 140 tensioned against a waveguide 150. The waveguide 150 may be part of an FTIR-based touch sensor. In this regard, the waveguide 150 may receive radiation (e.g., infrared light) from a radiation source (e.g., an infrared LED) and cause at least some of the received radiation to undergo total internal reflection. When a touch input is received, some of the received radiation undergoing total internal reflection is frustrated and escapes from the waveguide 150. An imaging sensor detects the escaped radiation and detects a touch input based on detection of the escaped radiation.

As shown in FIGS. 14-17, the tensioning system tensions the over-layer 140 closely against the waveguide 150 throughout an entire surface of the waveguide 150 without adhering the over-layer 140 to the waveguide 150 using an adhesive. Because the over-layer 140 is not adhered to the waveguide 150, an air gap may be maintained between the over-layer 140 and the waveguide 150. For example, the over-layer 140 may have microscopic roughness on a surface of the over-layer 140 that contacts the waveguide 150. In this example, the microscopic roughness provides a sufficient air gap to enable radiation to undergo total internal reflection within the waveguide 150. In addition, because the air gap is relatively small, the over-layer 140 may be tensioned in very close contact against the waveguide 150 throughout its entire surface, which provides a relatively good touch response throughout.

In some of the disclosed implementations, frustrated total internal reflection—(FTIR) based touch sensors may be used, and touch events may be registered based on changes in light observed by one or more image sensors that result from light escaping from the FTIR-based touch sensors as a consequence of contact being made with the waveguide by appropriate input mechanisms, such as, for example, fingers. Any type of FTIR-based touch sensor that would benefit from a tensioned over-layer may be used. For example, the screen tensioning system and technology described throughout this disclosure may be applied to the FTIR-based touch sensors described in co-pending, commonly owned U.S. Provisional Patent Application Ser. No. 61/182,992 and the corresponding utility patent application, entitled "Touch Sensing," filed Apr. 9, 2010, and assigned U.S. patent application Ser. No. 12/757,693, both of which are incorporated herein by reference in their entireties.

A number of implementations have been described. Nevertheless, it will be understood that various modifications may be made. For instance, although the disclosure has focused on applying the screen tensioning system to FTIR-based touch sensors, the described screen tensioning system may be applied to systems other than those that involve FTIR. In this regard, the described screen tensioning system may be applied in any system to hold an over-layer (e.g., a film) flat against any type of rigid flat object.

It will be understood that various modifications may be made. For example, other useful implementations could be achieved if components in the disclosed systems were combined in a different manner and/or replaced or supplemented by other components. Accordingly, other implementations are within the scope of the disclosure.

What is claimed is:
1. A tensioning system comprising:
a layer of a device;

a flexible overlay film that is configured to cover the layer of the device; and a tensioning mechanism that is configured to tension the flexible overlay film against the layer of the device throughout a periphery, the tensioning mechanism being configured to apply forces to the flexible overlay film in two directions such that the flexible overlay film translates toward the layer of the device while causing contact between a portion of the flexible overlay film and the layer of the device without using adhesive at the portion of the flexible overlay film to adhere the portion of the flexible overlay film to the layer of the device, the portion of the flexible overlay film being at least a majority of the flexible overlay film.

2. The tensioning system of claim 1, wherein the tensioning mechanism is configured to hold the flexible overlay film tight in a third dimension that is perpendicular to the two dimensions in which the flexible overlay film is allowed to move.

3. The tensioning system of claim 1, wherein the portion of the flexible overlay film comprises an entire surface of the flexible overlay film and the tensioning mechanism is configured to tension the flexible overlay film in close proximity to the layer of the device over an entire surface of the layer of the device.

4. The tensioning system of claim 1, wherein the tensioning mechanism is configured to allow expansion and contraction of the flexible overlay film in two dimensions.

5. The tensioning system of claim 1, wherein the tensioning mechanism includes stiffeners that are attached to the flexible overlay film, that transfer forces to the flexible overlay film, and that spread point loads over a larger area.

6. The tensioning system of claim 5, wherein the stiffeners distribute high tension across each edge of the flexible overlay film and provide a relatively uniform tension on a perimeter of the flexible overlay film.

7. The tensioning system of claim 5, wherein the stiffeners comprise material that has a coefficient of thermal expansion that is equal to or greater than a coefficient of thermal expansion of the flexible overlay film such that the stiffeners expand and contract with the flexible overlay film.

8. The tensioning system of claim 1, wherein the tensioning mechanism includes tension clips that are configured to translate a linear pull direction into horizontal and vertical directions.

9. The tensioning system of claim 8, wherein the tension clips comprise a spring like material.

10. The tensioning system of claim 8, wherein the tension clips enable bi-directional movement by having an applied force in a first plane and a reaction force in a second plane that is different than the first plane, thereby causing a rotational moment that rotates the flexible overlay film toward the layer of the device.

11. The tensioning system of claim 8, wherein the tensioning mechanism includes flexures that provide lever arms configured to induce the linear pull on the tension clips.

12. The tensioning system of claim 1, wherein the tensioning mechanism includes at least one tension adjusting mechanism that is configured to adjust tension of the flexible overlay film.

13. The tensioning system of claim 1, further comprising a fastening mechanism configured to secure the layer of the device in a manner that decouples thermal expansion of the layer of the device from the tensioned flexible overlay film.

14. The tensioning system of claim 13, wherein the fastening mechanism comprises a series of radial machined slots and fasteners that enable movement of the layer of the device in first and second directions and restrict movement of the layer of the device in a third direction, the first direction being different than the second direction and the third direction being different than the first and second directions.

15. The tensioning system of claim 14, wherein the fastening mechanism comprises a mounting hole pattern that is radial from a center fastener and symmetric, the center fastener securing the layer of the device relatively tightly and other fasteners having slotted configurations that allow expansion and contraction of the layer of the device.

16. The tensioning system of claim 1, further comprising a fastening mechanism configured to secure the layer of the device in a manner that allows movement of the layer of the device in first and second directions while restricting movement of the layer of the device in a third direction, the first direction being different than the second direction and the third direction being different than the first and second directions.

17. The tensioning system of claim 16, wherein the fastening mechanism comprises a slotted hole that allows movement of the layer of the device in the first and second directions and a shoulder part that restricts movement of the layer of the device in the third direction.

18. The tensioning system of claim 1, wherein the layer of the device is an optical waveguide configured to receive radiation and to cause at least some radiation to undergo total internal reflection within the optical waveguide, and the tensioning mechanism is configured to allow an air gap to be maintained between the flexible overlay film and the layer of the device such that total internal reflection of radiation within the optical waveguide occurs.

19. A touch-screen device comprising:

a radiation source configured to emit radiation;

an optical waveguide configured to receive radiation emitted from the radiation source and to cause at least some of the received radiation to undergo total internal reflection within the optical waveguide;

a flexible overlay film that is configured to cover the optical waveguide;

a tensioning mechanism that is configured to tension the flexible overlay film against the optical waveguide throughout a periphery while maintaining an air gap between at least part of the flexible overlay film and the optical waveguide and that is configured to apply forces to the flexible overlay film in two directions such that the flexible overlay film translates toward the layer of the device; and an imaging sensor configured to detect radiation that is coupled out of the optical waveguide when frustrated by a touch input.

\* \* \* \* \*